Feb. 24, 1959 A. KARLER 2,875,144
APPARATUS FOR ELECTRO-CHROMATOGRAPHIC SEPARATION
Filed Dec. 23, 1955 3 Sheets-Sheet 1
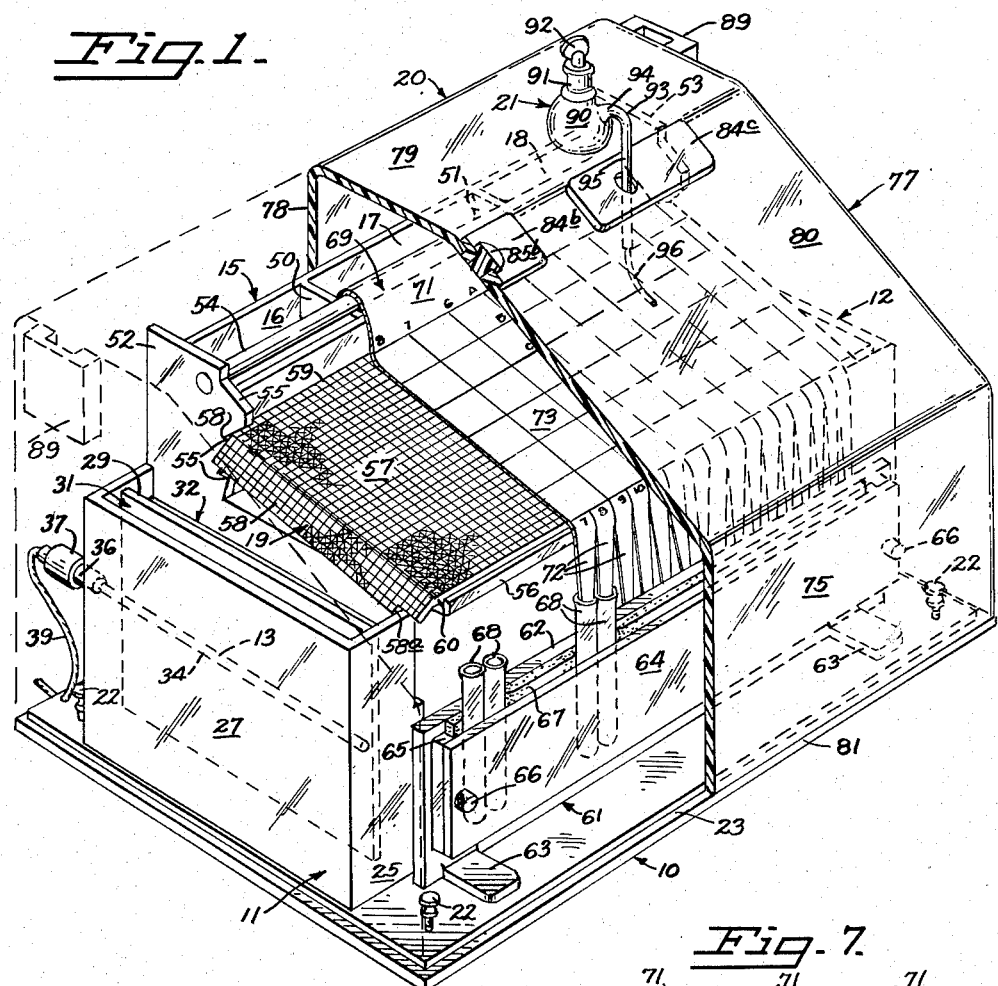
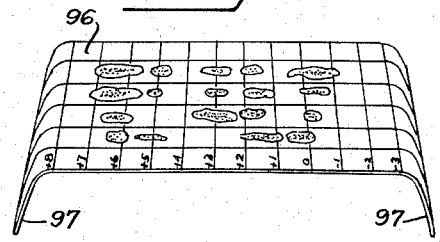
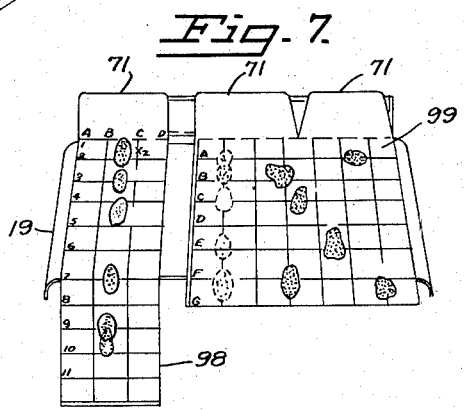
INVENTOR.
ARTHUR KARLER
BY
Townsend, Townsend and Hoppe
ATTORNEYS

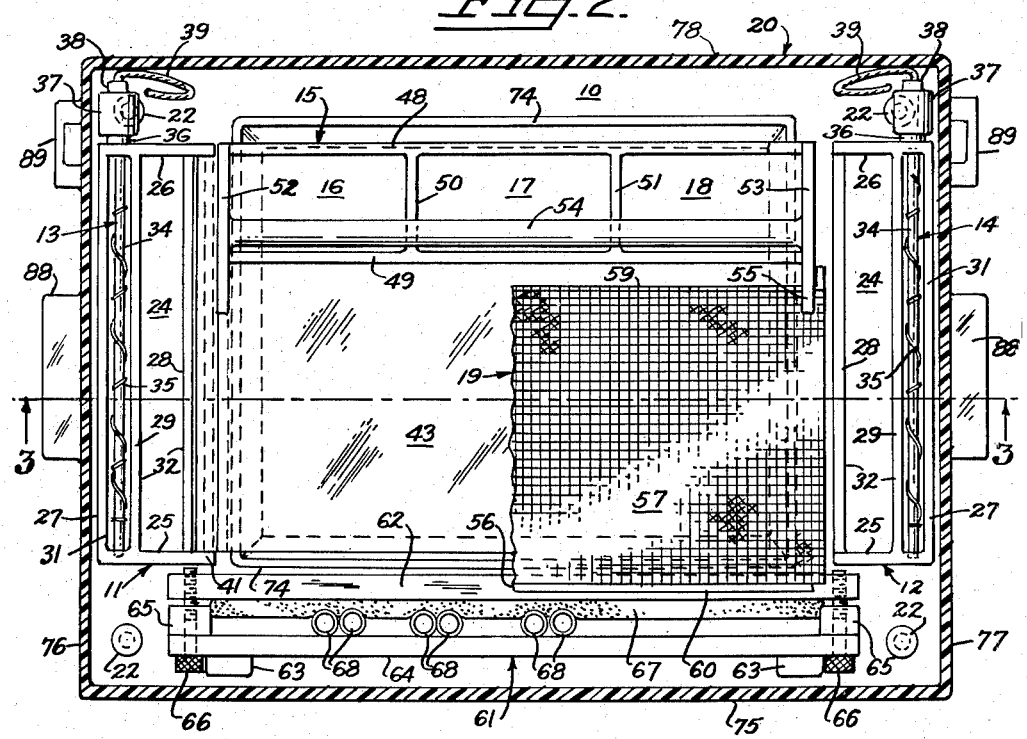
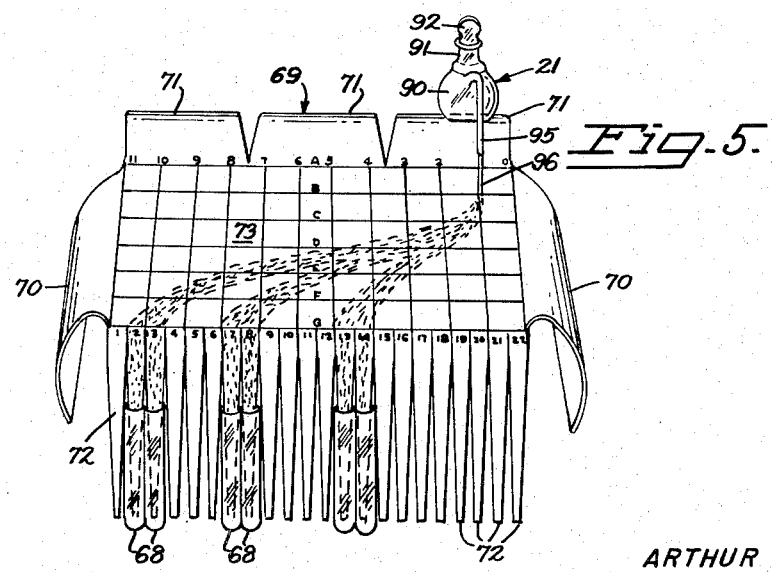

Feb. 24, 1959 — A. KARLER — 2,875,144
APPARATUS FOR ELECTRO-CHROMATOGRAPHIC SEPARATION
Filed Dec. 23, 1955 — 3 Sheets-Sheet 3

INVENTOR.
ARTHUR KARLER
BY Townsend, Townsend and Hoppe
ATTORNEYS

United States Patent Office 2,875,144
Patented Feb. 24, 1959

2,875,144

APPARATUS FOR ELECTROCHROMATOGRAPHIC SEPARATION

Arthur Karler, El Cerrito, Calif.

Application December 23, 1955, Serial No. 555,052

1 Claim. (Cl. 204—299)

This invention relates to the arts of electrophoresis; chromatography and electrochromatography and to apparatus adapted to carry out such arts.

Electrophoresis is essentially a one-dimensional fractionation process in which fractionation is brought about by migration in an electrical field.

Chromatography is essentially a one-dimensional fractionation process in which fractionation is brought about by the action of fluid flow through an adsorbent medium.

Electrochromatography is essentially a two-dimensional fractionation process involving the simultaneous operation of both electrophoretic and chromatographic forces at right angles to each other. In electrochromatography, two distinct physical chemical processes are simultaneously and continuously involved in the movement of the substance undergoing fractionation. As a result, electrochromatography offers possibilities for analytical and preparative fractionation of complex mixtures where neither electrophoresis nor chromatography alone have proven effective.

The principal type of prior art electrochromatographic apparatus thus far developed has been the vertical hanging curtain type. This type demonstrates the analytical and preparative possibilities of the continuous flow electrochromatographic method, but the usual machines themselves are generally bulky and expensive and usually require considerable experience, skill and attention to their proper operation. These factors naturally tend to restrict the use of such apparatus to large project and group type research.

It is, therefore, an object of this invention to provide a compact, versatile apparatus which incorporates the electrochromatographic method without sacrificing the simplicity, inexpensiveness and automaticity of conventional electrophoresis and chromatography.

It is a further object of this invention to provide an instrument which, in addition to continuous flow electrochromatography, can also be used in paper electrophoresis and paper chromatography either in a one-dimensional or a two-dimensional form of operation.

It is an additional object of this invention to provide an apparatus of the type described in which the reactive forces of gravity during the separating process are controlled through the provision of adjustable means for effectively pre-selecting a desired reduction in the effective force of gravity.

For a better understanding of the present invention, together with other and further objects thereof, reference is had to the following description taken in connection with the accompanying drawings, while the scope of the present invention is pointed out in the appended claim.

In accordance with a selected embodiment of the invention, there is disclosed an electrochromatographic apparatus consisting of a heavy base, a pair of electrode vessels, solvent reservoir chambers, an adjustable fractionation surface, a cover and a continuous feed sample device.

Full details of the foregoing structure are illustrated in the drawings in which:

Fig. 1 is a perspective view of a selected embodiment of the present invention looking downwardly from the left front corner of the apparatus;

Fig. 2 is a plan view looking downwardly on the apparatus with some of the elements broken away and with others cut away for clarity of understanding;

Fig. 5 is a diagrammatic view of the paper curtain and the continuous feed sample device used in the apparatus;

Fig. 6 is a schematic view illustrating the device used for conventional paper electrophoresis; and Fig. 7 is a schematic view illustrating the use of the apparatus for chromatographic analysis.

Figure 3:
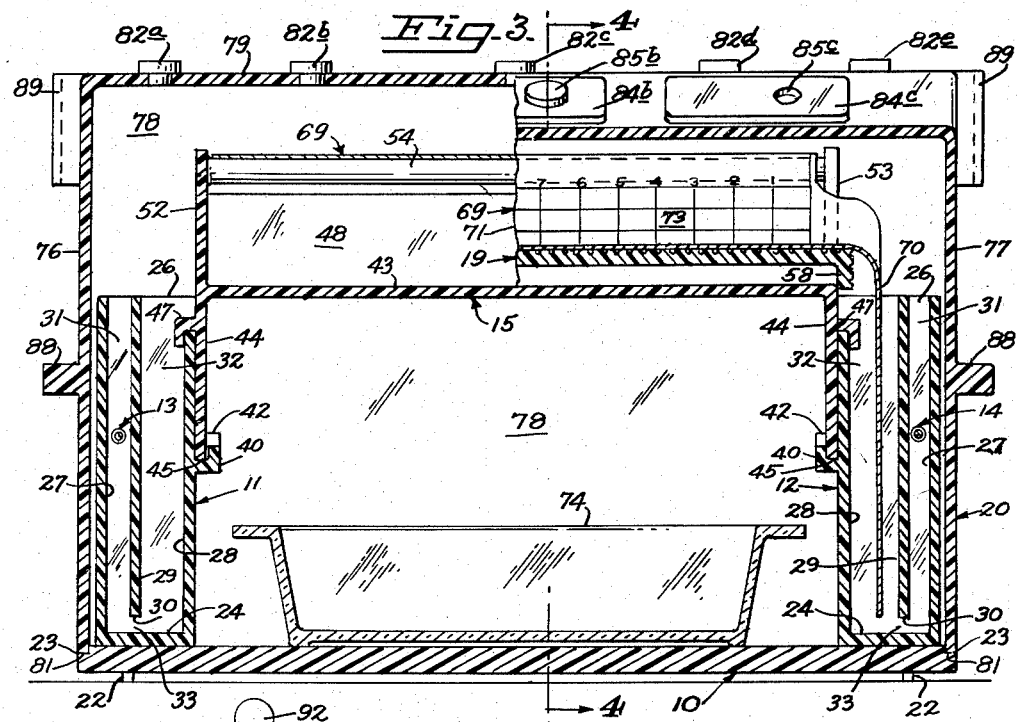
Fig. 3 is a longitudinal sectional view of the apparatus taken generally on the line 3—3 of Fig. 2.
Figure 4:
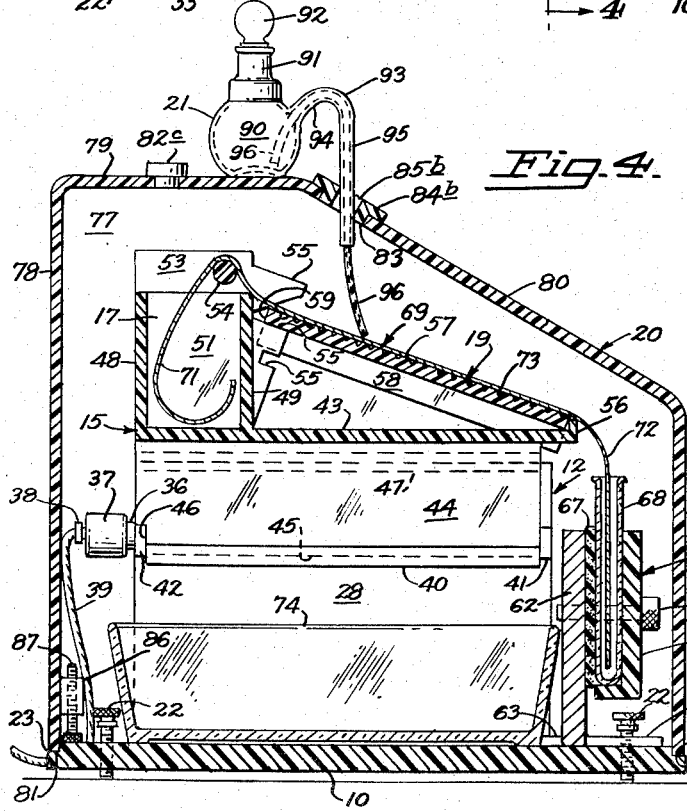
Fig. 4 is a cross sectional view of the apparatus looking toward the right on the line 4—4 of Fig. 3.

The electrochromatographic apparatus illustrated in the drawings comprises a heavy base 10; a pair of electrode vessels 11, 12; a pair of electrodes 13, 14 placed in the electrode vessels 11, 12, respectively; a central frame 15 provided with solvent reservoir chambers 16, 17, 18; an adjustable fractionation surface 19; a cover 20; and a continuous feed sample device 21.

The heavy base 10 is made in the form of a rectangle and is provided with an adjustable leveling screw 22 adjacent each of its four corners. Around its rim, the base 10 is supplied with a recess 23 cut into the upper face of base 10 and extending on all four sides.

The two electrode vessels 11 and 12 rest on the upper surface of base 10 adjacent each of the two sides. The two vessels 11, 12 are mirror images one of the other and the description of one of the vessels should be understood as including the construction of both of them. These vessels are formed in the shape of an open-topped box having a bottom wall 24, a front wall 25, a rear wall 26, an outer wall 27 and an inner wall 28. As appears in the drawings, the inner wall of the vessel is not quite as high as walls 25, 26 and 27.

A baffle member 29 is fitted in the interior of each vessel and the lower edge 30 of this baffle member 29 is spaced above bottom wall 24 of the vessel. The walls and baffle just described define an electrode chamber 31 and a curtain-receiving chamber 32; the chambers 31 and 32 being interconnected by an elongated port 33.

The electrodes 13 and 14 are furnished in the electrode chambers 31 of electrode vessels 11 and 12, respectively. Each electrode comprises a rod 34 of a transparent plastic material, around which there is wrapped a platinum wire 35. Each rod 34 is inserted through a tubular boss 36 secured to the rear wall 26 of the electrode vessel. The outer surface of boss 36 is threaded and there is arranged in engagement with this threaded surface an internally threaded cap 37 which secures rod 34 in place in boss 36 and seals the unit against leakage. The rearward end of cap 37 is equipped with a screw-in wire connector 38 to which there is secured a lead wire 39. In the illustrated embodiment, the lead wire 39 of lefthand electrode vessel 11 is connected to the negative terminal of a source of direct current and the lead wire 39 of the righthand electrode vessel 12 is connected to the positive terminal of a source of direct current.

Inner wall 28 of each vessel is provided with an L-shaped bracket 40 provided with end members 41, 42 adjacent each end of L-shaped bracket 40 to define a recess in which central frame 15 of the apparatus rests.

Central frame 15 of the apparatus is constructed in the form of an inverted channel having a bed 43 and downwardly extending legs 44. The lower edge 45 of each leg 44 rests in L-shaped bracket 40 arranged on the interior wall of the corresponding electrode vessel. A recess 46 is cut out at the rearward lower corner of each leg 44 and mates with rearward end member 42 associated with its companion L-shaped bracket 40. Each leg 44 is supplied with an L-shaped bracket 47 which overlies the upper edge of its companion inner wall 28 of companion electrode vessel. Thus when frame 15 and electrode vessels 11, 12 are assembled, the parts rest together with stability.

The rear upper surface of bed 43 is provided with three electrode vessels 16, 17 and 18 referred to earlier in the specification. The bottom wall of these electrode vessels comprises bed 43 of frame 15. There is also provided a rear wall 48, a front wall 49, partitions 50, 51 and end walls 52, 53. A round rod 54 interconnects two end walls 52, 53.

End walls 52, 53 extend forwardly and are each provided with a plurality of shelf-like members 55. An upwardly extending lip 56 is provided in the front end of bed 43 of frame 15. These shelf members 55 and front lip 56 form a support for the adjustable fractionation surface plate 19, as will appear later in this specification.

Plate 19 is mounted above and in association with frame 15. Plate 19 is provided with an upper face 57 formed of a plurality of four side pyramids arranged side by side in a grid pattern. The ends 58 of surface plate 19 depend downwardly and are similarly provided with the same pyramid surface as that on upper face 57. Ends 58 are in substantial alignment with the inner sides of curtain-receiving chambers 32 of electrode vessels 11, 12. The rear edge portion 59 of surface plate 19 rests upon any desired set of shelves 55 carried by end walls 52, 53, whereas the front edge 60 of surface plate 19 rests against front lip 56 of frame 15. Recesses 58$^a$ are provided in the front lower corner of each end 58 so as to form a relief for the front walls 25 of the electrode vessels.

It will be observed that the angle of surface plate 19 can be adjusted, depending upon which set of sehlves 55 is used. More specifically, plate 19 may be laid flat upon bed 43; it may be moved up to the first set of shelves 55, which will give an angle of approximately 10°; it may be moved up to the second set of shelves 55, which will give an angle of about 20°; or it may be moved to the top set of shelves 55, which will give it an angle of about 30°.

There is arranged parallel with and beneath front lip 56 of bed 43 a fraction collector stand 61. This fraction collector stand comprises a vertically extending rear plate 62 having feet 63 adjacent its ends. Vertically extending front plate 64 is L-shaped in cross section and is provided with end members 65. This plate 64 is urged toward the vertically extending rear plate 62 by means of thumb screws 66 in threaded engagement with rear plate 62. Within the chamber defined by rear plate 62, front plate 64 and end member 65 there are arranged a thick sponge rubber sheet 67 and twenty-two pyrex test tubes 68, the arrangement from front to rear being front plate 64, test tubes 68, sponge rubber sheet 67 and rear plate 62.

A sheet of paper 69, upon which a sample is to be fractionated, is placed upon grid surface 59. This sheet of paper 69 is formed with a pair of electrode flaps 70, three solvent flaps 71, twenty-two drip points 72, and a fractionation area 73. Fractionation area 73 is furnished with a marked reference grid, as appears in the drawings.

In assembling the unit, fractionation area 73 of the paper is placed upon the upper face of fractionation surface plate 19; the electrode flaps 70 are placed within the curtain-receiving chambers 32 of electrode vessels 11, 12; the solvent flaps 71 are bent over round bar 54 and dip into buffer reservoirs 16, 17 and 18 and drip points 72 are aligned with corresponding test tubes 68.

Within the interior of the apparatus, there is a chamber defined by base 10, electrode vessels 11, 12, frame 15 and fraction collector stand 61. Within this chamber, and on the upper surface of base 10, there is placed a shallow, rectangular dish 74.

The entire apparatus thus far described is enclosed by cover 20. Cover 20 is formed in the shape of an open-bottomed piano shipping crate and has a front wall 75, side walls 76, 77, rear wall 78, top wall 79 and inclined front-top wall 80. The lower edge 81 of cover 20 mates with recess 23 surrounding the upper surface of base 10.

Top wall 79 is equipped with covered openings 82$^a$, 82$^b$, 82$^c$, 82$^d$ and 82$^e$. Openings 82$^a$ and 82$^e$ are arranged above electrode vessels 11 and 12 so that such electrode vessels may be filled with fluid and covered openings 82$^b$, 82$^c$ and 82$^d$ are arranged in alignment with reservoirs 16, 17 and 18 so as to replenish fluid in such reservoirs.

The upper marginal area of inclined front-top wall 80 is provided with three rectangular openings 83$^a$, 83$^b$ and 83$^c$. Each rectangular opening is furnished respectively with a rectangular cover plate 84$^a$, 84$^b$ and 84$^c$ and each of these in turn is outfitted with a circular covered port 85$^a$, 85$^b$ and 85$^c$.

A port of the series 85 in one of plates of the series 84 is arranged in a centered position upon said plate and two ports of the series 85 on two cover plates of the series 84 are arranged off center. This spacing arrangement gives flexibility of access to fractionation surface plate 19.

Two interiorly extending bosses 86 and two adjustment screws 87 are equipped at the interior lower edge of rear wall 78. These permit an adjustment of the alignment and tilt of cover 20.

Side walls 76, 77 are fitted with handles 88 and with recessed bosses 89. Handles 88 are, of course, provided for lifting cover 20 and bosses 89 are provided for accessory attachment purposes.

Continuous feed sample device 21 is set upon the top wall 78 of cover 20. Sample feed device 20 includes a bulbous body portion 90, a neck 91 and a stopper 92. Connected to the bulbous portion 90 there is a spout member 93 having an initial upward portion 94 and a downwardly depending portion 95. A flexible plastic tube 96 extends from the interior of bulbous portion 90 through spout 93 and out the lower end of downwardly extending portion 95 of the spout. A paper wick, not shown, is threaded through the flexible tube 96.

Having thus described the structure and mode of assembly of the specific embodiment of this invention, its mode of operation is now considered.

After all of the foregoing components have been assembled, electrode vessels 11, 12 are each filled with a buffer solution or solvent to a point approximately one-quarter inch above electrodes 13, 14. The three liquid compartments or reservoirs 16, 17 and 18 on the top of central frame 15 are then filled with liquid. The higher the reservoirs are filled, the faster the solvent will flow down the curtain. For example, with the fastest liquid feed rates, the reservoirs should be filled all the way to the top; whereas with the slowest liquid feed rates, just enough solvent should be supplied to permit the apparatus to run for about 24 hours before the solvent is replenished.

The bottom of shallow pyrex dish 74 is now covered with an aliquot of the buffer or solvent fluid used in the reservoirs and this dish is positioned on base 10 between electrode vessels 11, 12. The fluid contained in pyrex dish 74 is used for maintaining a saturated atmosphere within the machine.

The fractionation surface plate 19 is now placed in the desired one of the four possible positions. The angle pre-selected for this position gives further control over the rate of fluid flow down the curtain. This is true both with respect to the background fluid and the sample solution. The paper curtain 69 is now positioned with the fractionation area centered over the adjustable fractionation surface plate 19. The two electrode flaps 70 are inserted into curtain receiving chambers 32 of electrode vessels 11, 12 and the three solvent flaps 71 are inserted into their respective reservoirs 16, 17 and 18.

The cover is now affixed in place to minimize evaporation and hence aid in a rapid equilibration of the apparatus. Curtain 69 becomes wet by capillary action.

This in effect constitutes a chromatographic type of washing of the curtain and is an extremely effective way of removing impurities. Under normal operating conditions the paper will usually be wetted down to the top of the drip points in approximately one hour. The solvent front moving down the curtain gradually becomes contaminated with impurities from the curtain itself. In about one-half hour or more the solvent will reach the bottom of the drip points and then in one-half to one hour additional, the accumulated impurities from the curtain will be dissipated. When the impurities have been dissipated, cover 20 is removed and friction collector stand 61 is positioned with drip points 72 inserted into the respective test tubes 68. The apparatus is then recovered.

At this point in the operation of the apparatus, the curtain will have become completely wetted insofar as fluid flow equilibration is concerned. Lead wires 39 are then connected to the source of direct current thought best for the work at hand. After about 15 to 20 minutes a voltage current equilibration is normally completed. During this period there is usually a slight drop in the voltage across the apparatus and an appreciable rise in the conductivity of the curtain. The conductivity usually rises slowly during the first ten or fifteen minutes or so and then tapers off to a steady flow value during the next five minute period. Thus, the increase in conductivity gives the operator the key to equilibration. During this period of voltage current equilibration, a small amount of condensate usually builds up on top wall 79 of the apparatus. Once the voltage and current cease to change their values, the operator can assume that from an operational standpoint a satisfactory steady-state or equilibrium condition has been established for the initiation of sample feeding.

The sample feed device 21, with the sample to be fractionated within, is now placed on top wall 79 of the cover with the downwardly extending portion 95 of the spout and the flexible plastic tube 96 having a paper wick threaded therethrough extending through a pre-selected opening of the 85 series in one of the covers of the 84 series associated with one of the slots of the 83 series.

From this point on, the operation of the apparatus can be considered automatic. The apparatus requires no further attention until 24 hours have elapsed or, in cases of shorter runs, until the end of the experiment. The pattern developed by the electrochromatographic separation (see, for example, Fig. 5) can be observed. If additional solvent need be added, this may be done through the openings 82$^b$, 82$^c$ or 82$^d$. At the same time the sovlent in electrode vessels 11, 12 may be siphoned out through openings 82$^a$ and 82$^b$ and fresh electrode solvent added. The sample reservoir can also be replenished from time to time.

After the experiment has been completed, the curtain may be dried in order to make a permanent record of any substances that may have been left on the curtain at the end of a particular electrochromatographic separation which has been performed.

The adjustable inclined surface plate 19 gives the instant apparatus an unusual versatility. In addition to the electrochromatographic separation described above, the apparatus may be used for conventional paper strip electrophoresis and for paper chromatography.

When used for conventional paper strip electrophoresis, the surface plate 19 is placed in the horizontal position and a paper strip 96 is positioned across the surface with the ends 97 dipping into the curtain-receiving chambers 32 of electrode vessels 11, 12 (see Fig. 6). For two-dimensional paper electrophoresis, the paper sheet 96 may be arranged in the form of a square (e. g., element 99 in Fig. 7) and is rested upon the upper edges of two strips of paper of the same width serving to join the electrode vessels with the fractionation area. When the fractionation is complete in the first dimension, the wet paper square is rotated 90° and the fractionation is continued in the second dimension. This two-dimensional type of analysis is useful in checking on the absorptivity and mobilities of compounds and in effecting further resolution than can be obtained in the usual one-dimensional procedure.

When the apparatus is used for one and two-dimensional paper chromatography, aqueous-type or water-saturated solvents are employed. In this mode of operation, the fractionation surface plate 19 is placed in an angular position and paper strip 98 (Fig. 7) is placed upon the plate. The apparatus, with its enclosed chamber and versatility in controlling the rate of movement down the paper, makes it especially suitable for chromatographing samples which must be applied to a wetted surface or adsorbent, such, for example, as surface-denaturable proteins. For two-dimensional chromatography, a paper sheet 99 is arranged in the form of a square and it rests upon two strips of paper dipping into the solvent reservoirs. When the fractionation is complete in the first dimension, the wet paper square is rotated 90° and fractionation continued in the second dimension.

While there has been described above what is at present considered to be the preferred embodiment of the invention, it will be obvious to those skilled in the art that various changes and modifications may be made therein without departing from the invention. The appended claim is, therefore, intended to cover all such changes and modifications as fall within the true spirit and scope of the invention as distinctly claimed therein.

I claim:

Electrochromatographic apparatus comprising: a central frame work; a rectangular surface plate provided with a surface having a plurality of four sided pyramids continuously covering substantially the entire area of the surface plate; said upper face being defined by a front lip, a rear edge, and two end edges; means for adjustably supporting said surface plate upon said frame, said means providing a range of angular adjustment of said rear edge with respect to said front lip including the range from zero degrees to 30 degrees above the horizontal; two electrode vessels extending over the length of each side of the frame and commensurate with the side edges of the surface plate, each electrode vessel being longitudinally divided by a partition into inner curtain receiving chambers and outer electrode chambers and being interconnected by an elongated port at the bottom of each said partition to provide for electrolyte communication between said chambers; a plurality of solvent reservoir chambers adjoining the rear edge of said fractionation surface plate; a paper curtain upon said fractionation surface plate; solvent reservoir tabs on said paper curtain in engagement with said solvent reservoir chambers, electrode vessel engaging elements, one on either side of said paper curtain, arranged in engagement with the curtain element receiving chambers of said electrode vessels; and a plurality of drip points on said paper curtain and depending downwardly over the front lip of said fractionation surface plate.

References Cited in the file of this patent

UNITED STATES PATENTS

| | | |
|---|---|---|
| 1,949,729 | Peale et al. | Mar. 6, 1934 |
| 2,555,487 | Haugaar et al. | June 5, 1951 |
| 2,768,948 | McDonald et al. | Oct. 30, 1956 |

FOREIGN PATENTS

| | | |
|---|---|---|
| 716,875 | Great Britain | Oct. 13, 1954 |

OTHER REFERENCES

Fox: Chem. Products, July 1954, pp. 260–266.

Block et al.: A Manual of Paper Chromatography and Paper Electrophoresis, Academic Press Inc. New York, 1955, pages 348–405 and 439–441.

McDonald: Ionography, The Year Book Publishers, Chicago, Sept. 1, 1955, pp. 13 and 14.